United States Patent
Hashimoto et al.

(10) Patent No.: US 7,367,309 B2
(45) Date of Patent: May 6, 2008

(54) INTERNAL COMBUSTION ENGINE

(75) Inventors: Kohtaro Hashimoto, Wako (JP); Kohjiroh Aimoto, Wako (JP); Fumiaki Ikegawa, Wako (JP); Takahiro Gunji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/512,095

(22) Filed: Aug. 30, 2006

(65) Prior Publication Data
US 2007/0068069 A1 Mar. 29, 2007

(30) Foreign Application Priority Data
Sep. 26, 2005 (JP) .............................. 2005-276983

(51) Int. Cl.
- F02B 43/00 (2006.01)
- F02B 5/00 (2006.01)
- C10L 1/00 (2006.01)

(52) U.S. Cl. .................. 123/295; 123/305; 123/1 A

(58) Field of Classification Search ............... 123/1 A, 123/295, 305, 431; 44/307, 322, 326, 329, 44/333, 353; 585/14
See application file for complete search history.

(56) References Cited

U.S. PATENT DOCUMENTS

| | | | | |
|---|---|---|---|---|
| 4,092,127 A | * | 5/1978 | Ryer et al. ..................... 44/317 |
| 4,525,289 A | * | 6/1985 | Howie et al. ................ 508/428 |
| 4,844,717 A | * | 7/1989 | Croudace et al. ............. 44/418 |
| 4,938,884 A | * | 7/1990 | Adams et al. ............... 508/428 |
| 5,807,413 A | * | 9/1998 | Wittenbrink et al. .......... 44/451 |
| 6,150,575 A | * | 11/2000 | Angevine et al. .............. 585/14 |
| 6,187,171 B1 | * | 2/2001 | Tsuboi ........................ 208/16 |
| 6,488,732 B2 | * | 12/2002 | Scanlan .......................... 71/8 |
| 6,746,495 B2 | * | 6/2004 | Avery et al. ................... 44/640 |
| 6,814,032 B2 | * | 11/2004 | Goto ..................... 123/27 GE |
| 6,906,011 B2 | * | 6/2005 | Harrison et al. ............. 508/192 |
| 6,983,730 B2 | * | 1/2006 | Kuzuyama ................... 123/294 |
| 7,066,158 B2 | * | 6/2006 | Kuzuyama ................... 123/561 |
| 7,131,402 B2 | * | 11/2006 | Sobotowski et al. ......... 123/1 A |
| 2002/0045785 A1 | * | 4/2002 | Bazzani et al. ................ 585/14 |
| 2003/0040650 A1 | * | 2/2003 | Butler et al. ................... 585/14 |
| 2003/0052041 A1 | * | 3/2003 | Erwin et al. ................... 208/15 |

FOREIGN PATENT DOCUMENTS

JP 2004-150383 A 5/2004

* cited by examiner

Primary Examiner—Willis R. Wolfe
Assistant Examiner—Johnny H. Hoang
(74) Attorney, Agent, or Firm—Birch, Stewart, Kolasch & Birch, LLP

(57) ABSTRACT

An internal combustion engine is provided which can operate by either the homogeneous charge compression ignition system or the spark ignition system using a single fuel. In the internal combustion engine using a fuel containing a hydrocarbon, the fuel contains o-xylene of 10 to 70 wt. % of the total weight, and the engine operates by either homogeneous charge compression ignition or spark ignition depending on the load. The fuel contains o-xylene of 30 to 50 wt. % of the total weight. The fuel contains, for example, n-heptane as the base fuel, and o-xylene of 10 to 70 wt. %, preferably 30 to 50 wt. %, of the total base fuel. The internal combustion engine operates by homogeneous charge compression ignition at low or medium load and by spark ignition at high load.

5 Claims, 1 Drawing Sheet

INTERNAL COMBUSTION ENGINE

BACKGROUND OF THE INVENTION

1. Field of the Invention

The present invention relates to an internal combustion engine using a fuel containing hydrocarbons.

2. Description of the Related Art

In recent years, in internal combustion engines using a fuel containing hydrocarbons, employing of the homogeneous charge compression ignition system has been studied to reduce the emission amount of pollutants such as NOx and soot. Internal combustion engines using the homogeneous charge compression ignition system involve preliminarily mixing a fuel and air, and compressing the obtained fuel-air mixture to self-ignition. If an internal combustion engine using the homogeneous charge compression ignition system is used, since a homogeneous dilute fuel-air mixture is made to burn, the combustion temperature does not become high, and the generation amount of NOx can be suppressed low; and since the fuel-air mixture burns homogeneously in a combustion chamber, the generation amount of soot can be suppressed low.

However, in internal combustion engines using the homogeneous charge compression ignition system, since the ignition timing is determined according to the temperature and the pressure in the combustion chamber, the ignition control is difficult, raising a problem of the engines being able to be stably operated only under a low or medium load, at a low or medium rotation.

By contrast, in internal combustion engines using the spark ignition system, since a fuel-air mixture in a combustion chamber is ignited by a spark, if a timing to generate a spark is suitably set, the fuel-air mixture can surely be made to burn, and the engines can be stably operated even under a high load, at a high rotation. So, an internal combustion engine is proposed which operates by either the homogeneous charge compression ignition system or the spark ignition system depending on its load (for example, seeing Japanese Patent Laid-Open No. 2004-150383)

However, since although the homogeneous charge compression ignition system requires a fuel having a high ignitability, the spark ignition system requires a fuel having a low ignitability, there exists an inconvenience that it is difficult to operate by either the homogeneous charge compression ignition system or the spark ignition system in an internal combustion engine with a single fuel.

SUMMARY OF THE INVENTION

The present invention has an object to solve such an inconvenience and provide an internal combustion engine which can operate by either the homogeneous charge compression ignition system or the spark ignition system using a single fuel.

For achieving such an object, the present invention is characterized in that, in an internal combustion engine using a fuel containing hydrocarbons, the fuel contains o-xylene of 10 to 70 wt. % of the total weight, and in operating by either homogeneous charge compression ignition or spark ignition depending on its load.

The fuel can be made to have a high research octane number and a low ignitability at spark ignition by containing o-xylene in that range; and the fuel can be made to have a high ignitability at homogeneous charge compression ignition by containing o-xylene in that range.

Therefore, the internal combustion engine of the present invention can operate by either homogeneous charge compression ignition or spark ignition depending on its load using a single fuel, and can stably be operated without generating abnormal combustion such as knocking in either of the ignition systems.

With the o-xylene content of the fuel of less than 10 wt. % of the total weight, the fuel cannot be made to have a sufficiently high research octane number. With the o-xylene content of the fuel exceeding 70 wt. % of the total weight, there arise inconveniences such as the decrease in a vaporization mixing property and increase in pollutants in the emission gas and deposits in the combustion chamber.

In the internal combustion engine of the present invention, the fuel preferably contains o-xylene of 30 to 50 wt. % of the total weight for easily operating by either homogeneous charge compression ignition or spark ignition depending on its load.

DETAILED DESCRIPTION OF THE PREFERRED EMBODIMENT

Figure 1:
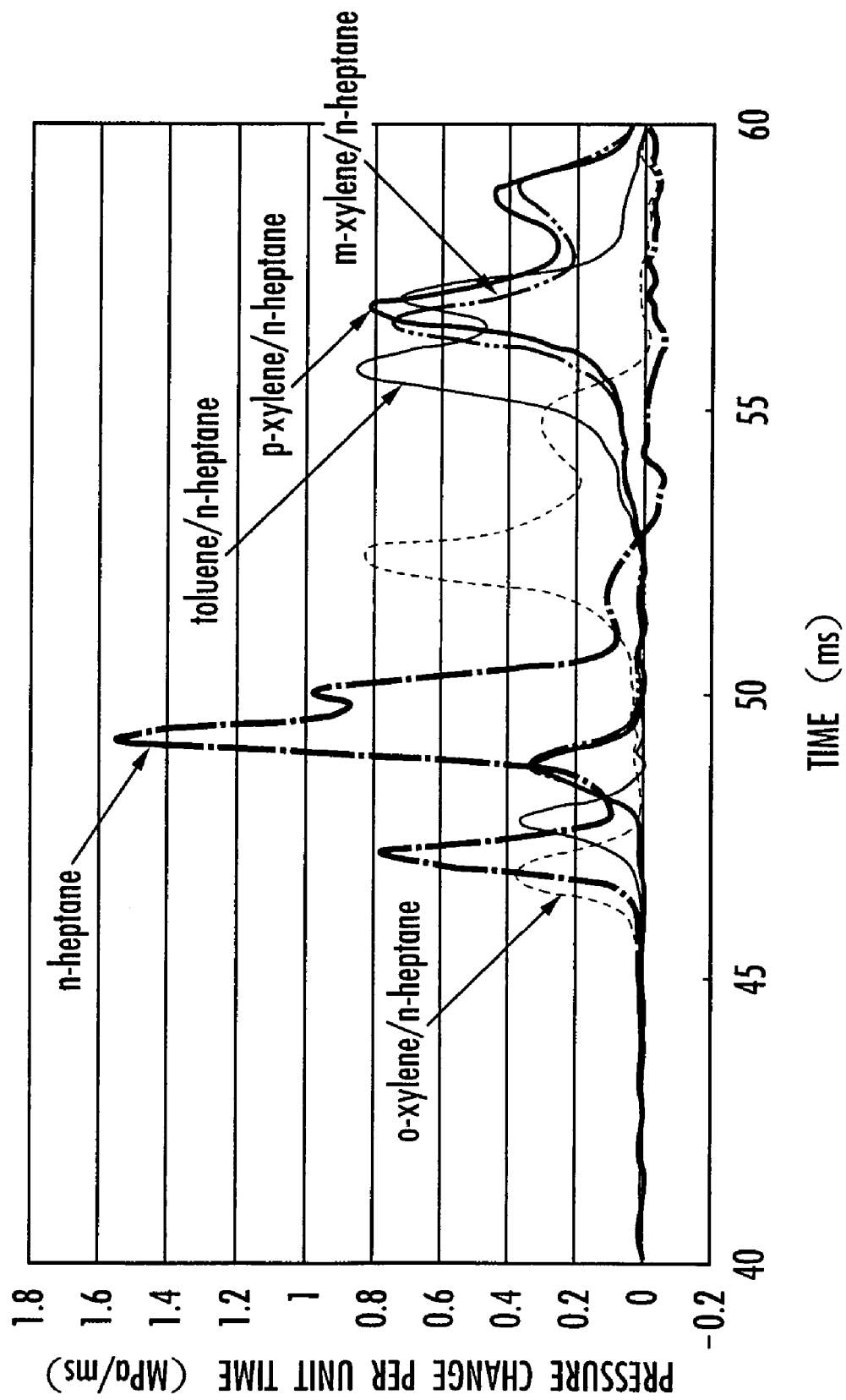
FIG. 1 is a graph showing changes with time in pressure changes per unit time when various kinds of fuels are self-ignited by homogeneous charge compression ignition.

Then, an embodiment of the present invention will be further in detail described referring to the attached drawing.

The internal combustion engine of the embodiment uses a fuel containing o-xylene of 10 to 70 wt. %, preferably 30 to 50 wt. %, of the total weight, and operates by either homogeneous charge compression ignition or spark ignition depending on its load. Specifically, the internal combustion engine of the present invention uses the homogeneous charge compression ignition under a low or medium load, and the spark ignition under a high load.

The fuel contains a hydrocarbon including, for example, n-heptane as a base fuel and contains o-xylene in the above-mentioned range. The fuel can be made to have a high research octane number and a low ignitability at spark ignition by containing o-xylene in the above-mentioned range. Further, the fuel can be made to have a high ignitability at homogeneous charge compression ignition by containing o-xylene in the above-mentioned range.

Then, a base fuel composed of n-heptane and each fuel in which n-heptane is added with toluene or each isomer of xylenes of 50 wt. % of the total weight were measured for the research octane numbers (RON) according to the method provided in JIS K 2280. The results are shown in Table 1.

TABLE 1

| | Research octane number |
|---|---|
| n-heptane | 0 |
| o-xylene/n-heptane | 63 |
| m-xylene/n-heptane | 64 |
| p-xylene/n-heptane | 64 |
| toluene/n-heptane | 54 |

As is clear from Table 1, n-heptane is made to have a high research octane number and a low ignitability at spark ignition by being added with toluene or each isomer of xylenes.

Then, an experiment on homogeneous charge compression ignition combustion was conducted by a rapid compression machine (RCM) using each fuel shown in Table 1. The rapid compression machine is equipped with a cylindrical combustion chamber of a 80-mm inner diameter and a 80-mm compression stroke, and compresses a fuel-air mixture of a fuel and air supplied to the combustion chamber by a piston to make the mixture self-ignite and burn. The displacement is 402 ml.

In the experiment on homogeneous charge compression ignition combustion, the compression ratio was set to be 13.9. First, a fuel was charged in the combustion chamber by syringe injection; and, the fuel was allowed to stand for 5 min for complete vaporization of the fuel. Then, after air was introduced in the combustion chamber up to atmospheric pressure, the fuel-air mixture of the fuel and air was allowed to stand for homogenizing the mixture. Thereafter, the fuel-air mixture in the combustion chamber was compressed by the piston to make the mixture self-ignite and burn. In the experiment on homogeneous charge compression ignition combustion, the temperature of the cooling water and the charging temperature were both set to be 40° C., and the amount of the fuel was adjusted to become 0.3 in equivalent ratio.

In the experiment on homogeneous charge compression ignition combustion, a time point when the pressure in the combustion chamber had reached 3 MPa was defined as a hot flame start, and a time from the compression start to the hot flame start was defined as an index of the ignitability of the homogeneous charge compression ignition. The results are shown in Table 2.

The change with time in the pressure change per unit time of the each fuel in the experiment on homogeneous charge compression ignition combustion is shown in FIG. 1. In FIG. 1, for each fuel, the first peak is assigned to the cool flame combustion, and the second peak is assigned to the hot flame combustion.

TABLE 2

|  | Hot flame time (ms)* |
| --- | --- |
| n-heptane | 47.4 |
| o-xylene/n-heptane | 50.0 |
| m-xylene/n-heptane | 54.0 |
| p-xylene/n-heptane | 54.6 |
| toluene/n-heptane | 52.6 |

*Hot flame time: a time from the compression start to the hot flame start

As is clear from Table 2 and FIG. 1, the fuel in which n-heptane is added with o-xylene of 50 wt. % of the total weight has an earlier hot flame time and a higher ignitability at homogeneous charge compression ignition than each fuel in which n-heptane is added with each of toluene, m-xylene and p-xylene of 50 wt. % of the total weight.

The reason is considered as follows.

First, the case of toluene will be described referring to the following formula (1):

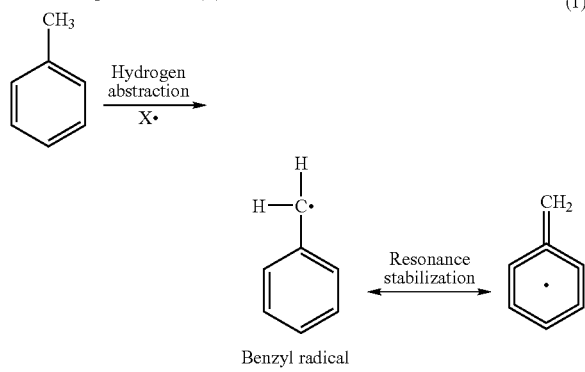

In this case, a radical first generated in the fuel-air mixture is consumed by abstracting a hydrogen atom from a benzyl group (a methyl group bonded to a benzene ring) of toluene. Consequently, the toluene itself becomes a benzyl radical, but the generated benzyl radical is scarce of reactivity because the unpaired electron is resonantly stabilized by the benzene ring.

Therefore, it is thought that since toluene consumes radicals as described above and suppresses the radical chain reaction to reach ignition, the ignition is suppressed, and the hot flame time is retarded behind n-heptane.

Then, in the cases of m-xylene and p-xylene, it is thought that since a xylene has two benzyl groups, and has a higher capability of consuming radicals than toluene, the hot flame time is further retarded behind toluene.

By contrast, in the case of o-xylene, since the two benzyl groups are mutually adjacent, the intramolecular hydrogen abstraction reaction possibly occurs when the oxygen molecule addition reaction occurs after the benzyl radical generation as shown in the following formula (2):

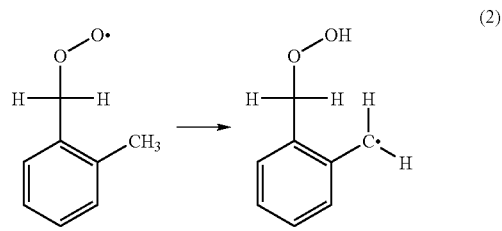

Consequently, o-xylene newly generates benzyl radicals by the intramolecular hydrogen abstraction reaction, which means an involvement of o-xylene itself with the radical chain reaction.

Therefore, it is thought that o-xylene has a lower effect of suppressing the ignition by consumption of radicals, and has an earlier hot flame time than toluene, and m-xylene and p-xylene of the isomers.

As is clear from above, a fuel in which n-heptane is added with o-xylene of 50 wt. % of the total weight has a higher octane number than n-heptane, a lower ignitability at spark ignition than n-heptane, and has a higher ignitability at homogeneous charge compression ignition than each fuel in which n-heptane is added with each of toluene, m-xylene and p-xylene of 50 wt. % of the total weight.

Accordingly, the internal combustion engine of the present invention, by using a single fuel in which n-heptane is added with o-xylene of 50 wt. % of the total weight, can stably be operated using the homogeneous charge compression ignition during the time of a low or medium load and the spark ignition during the time of a high load.

What is claimed is:

1. An internal combustion engine using a fuel comprising a hydrocarbon, wherein the fuel comprises o-xylene of 10 to 70 wt. % of the total weight, and wherein the engine operates by either homogeneous charge compression ignition or spark ignition depending on a load thereof.

2. The internal combustion engine according to claim 1, wherein the fuel comprises o-xylene of 30 to 50 wt. % of the total weight.

3. The internal combustion engine according to claim 1, wherein the fuel comprises n-heptane as a base fuel and o-xylene of 10 to 70 wt. % of the total base fuel.

4. The internal combustion engine according to claim 3, wherein the fuel comprises o-xylene of 30 to 50 wt. % of the total base fuel.

5. The internal combustion engine according to claim 1, wherein the engine operates by homogeneous charge compression ignition at a low or medium load thereof and by spark ignition at a high load thereof.

* * * * *